US009406944B2

(12) United States Patent
Chen et al.

(10) Patent No.: US 9,406,944 B2
(45) Date of Patent: Aug. 2, 2016

(54) SULFUR-TOLERANT ANODE MATERIAL FOR DIRECT HYDROCARBON SOLID OXIDE FUEL CELLS

(75) Inventors: Fanglin Chen, Irmo, SC (US);
Chenghao Yang, Columbia, SC (US);
Zhibin Yang, Columbia, SC (US)

(73) Assignee: University of South Carolina, Columbia, SC (US)

( * ) Notice: Subject to any disclaimer, the term of this patent is extended or adjusted under 35 U.S.C. 154(b) by 871 days.

(21) Appl. No.: 13/589,721

(22) Filed: Aug. 20, 2012

(65) Prior Publication Data

US 2013/0045437 A1     Feb. 21, 2013

Related U.S. Application Data

(60) Provisional application No. 61/575,302, filed on Aug. 18, 2011.

(51) Int. Cl.
| | |
|---|---|
| *H01M 4/86* | (2006.01) |
| *H01M 4/90* | (2006.01) |
| *H01M 4/88* | (2006.01) |
| *H01M 8/12* | (2016.01) |

(52) U.S. Cl.
CPC .......... *H01M 4/9033* (2013.01); *H01M 4/8621* (2013.01); *H01M 4/8647* (2013.01); *H01M 4/8652* (2013.01); *H01M 4/8657* (2013.01); *H01M 4/881* (2013.01); *H01M 4/8828* (2013.01); *H01M 4/9066* (2013.01); *H01M 2008/1293* (2013.01); *Y02E 60/50* (2013.01); *Y02E 60/525* (2013.01)

(58) Field of Classification Search
CPC ............ H01M 4/8647; H01M 4/8652; H01M 4/8657; H01M 4/8621
USPC .................................................. 429/479–497
See application file for complete search history.

(56) References Cited

PUBLICATIONS

Lu, Z.G. et al., A Co—Fe alloy as alternative anode for solid oxide fuel cell, Mar. 4, 2008, Journal of Power Sources, vol. 180, pp. 172-175.*
Liu, Z. et al., A-site deficient Ba1-xCo0.7Fe0.2Ni0.1O3-d cathode for intermediate temperature SOFC, May 31, 2010, Journal of Power Sources, vol. 196, pp. 868-871.*
Cheng et al, A Solid Oxide Fuel Cell Running on H2S / CH4 Fuel Mixtures, Electrochemical and Solid-State Letters, 2006, vol. 9, Issue 1, pp. A31-A33.
Choi et al., "Surface Modification of Ni-YSZ Using Niobium Oxide for Sulfur-Tolerant Anodes in Solid Oxide Fuel Cells", Journal of the Electrochemical Society, 2008, vol. 155, Issue 5, pp. B449-B454.
Guo et al., "Polyol-Synthesized PtRu/C and PtRu Black for Direct Methanol Fuel Cells", Journal of Power Sources, Jun. 2007, vol. 168, Issue 2, pp. 289-298.
Gross et al., "A Study of Thermal Stability and Methane Tolerance of Cu-Based SOFC Anodes with Electrodeposited Co", Electrochimica Acta, Jan. 2007, vol. 52, Issue 5, pp. 1951-1957.
Huang et al., "Double Perovskites as Anode Materials for Solid-Oxide Fuel Cells", Science, Apr. 2006, vol. 312, No. 5771, pp. 254-257.
Liu et al., "A Novel Electrode Material for Symmetrical SOFCs", Advanced Materials, Dec. 2010, vol. 22, Issue 48, pp. 5478-5482.

(Continued)

*Primary Examiner* — Jonathan G Leong
(74) *Attorney, Agent, or Firm* — Dority & Manning, P.A.

(57) ABSTRACT

In one aspect, the present subject matter is directed to a composite anode for a hydrocarbon solid oxide fuel cell, the anode comprising a layered perovskite ceramic and a bi-metallic alloy.

13 Claims, 11 Drawing Sheets

(56) References Cited

PUBLICATIONS

Marina et al., "Mitigation of Sulfur Poisoning of Ni/Zirconia SOFC Anodes by Antimony and Tin", Journal of the Electrochemical Society, 2011, vol. 158, Issue, 4, pp. B424-B429.

Nikolla et al., "Direct Electrochemical Oxidation of Hydrocarbon Fuels on SOFCs: Improved Carbon Tolerance of Ni Alloy Anodes" Journal of the Electrochemical Society, 2009, vol. 156, Issue 11, pp. B1312-B1316.

Tao et al., "A Redox-Stable Efficient Anode for Solid-Oxide Fuel Cells", Nature Materials, Mar. 2003, vol. 2, Issue 5, pp. 320-323.

Wang et al., "Methane-Fueled SOFC with Traditional Nickel-Based Anode by Applying $NiAl_2O_3$ as a Dual-Functional Layer", Electrochemistry Communications, Jan. 2009, vol. 11, Issue 1, pp. 194-197.

Yang et al., "Enhanced Sulfur and Coking Tolerance of a Mixed Ion Conductor for SOFCs: $BaZr_{0.1}Ce_{0.7}Y_{0.2-x}Yb_xO_{3-\delta}$", Science, Oct. 2009, vol. 326, No. 5949, pp. 126-129.

Zhan et al., "An Octane-Fueled Solid Oxide Fuel Cell", Science, May 2005, vol. 308, No. 5723, pp. 844-847.

Zhang et al., "$Sr_2C_oMoO_6$ Anode for Solid Oxide Fuel Cell Running on $H_2$ and $CH_4$ Fuels", Journal of Power Sources, Feb. 2011, vol. 196, Issue 4, pp. 1738-1743.

\* cited by examiner

SULFUR-TOLERANT ANODE MATERIAL FOR DIRECT HYDROCARBON SOLID OXIDE FUEL CELLS

CROSS-REFERENCE TO RELATED APPLICATION

The present application is based on and claims priority to U.S. Provisional Application 61/575,302 having a filing date of Aug. 18, 2011, which is incorporated by reference herein.

GOVERNMENT SUPPORT CLAUSE

This invention was made with government support under DE-SC0001061 awarded by United States Department of Energy. The government has certain rights in the invention.

BACKGROUND

A solid oxide fuel cell (SOFC) is a very promising energy conversion device to convert fuel chemical energy directly to electricity as schematically shown in FIG. 1. In addition to high energy conversion efficiency and low emissions, another significant advantage of SOFC is fuel flexibility. Fuels like hydrogen, natural gas, propane, biogases, liquid hydrocarbons or coal can be used as SOFC fuels.

However, there are two major challenges for a hydrocarbon fueled SOFC. One challenge is carbon deposition at the anode/electrolyte interface, which can lead to rapid degradation of the cell performance. Another challenge is sulfur poisoning which can dramatically degrade SOFC performance even when sulfur species are presented at the ppm level. Sulfur species such as hydrogen sulfide ($H_2S$) are widely present as impurities or additives in many economically available fuel sources, and their concentration can reach high levels as shown in Table 1.

External reforming of hydrocarbon fuels and removal of low concentration sulfur (at the ppm level) can add extra cost to the SOFC system. In order to prevent or mitigate coking deactivation of the SOFC anode for direct utilization of hydrocarbon fuels, three different strategies have typically been applied. One strategy is to develop new anode systems, such as Cu-based cermets and perovskite oxide anode such as $La_{0.75}Sr_{0.25}Cr_{0.5}Mn_{0.5}O_{3-\delta}$ (LSCM) and $Sr_2MgMoO_{6-\delta}$. Another strategy is to infiltrate noble metal catalyst (such as Pd and Ru) or alloy electrocatalysts (such as Sn/Ni alloy) into porous anode support. A third strategy is to fabricate a catalytic barrier on the cermet anode for internal reforming

TABLE 1

Typical composition and $H_2S$ concentration of some fuel sources

| Fuel type | Typical composition | $H_2S$ concentration |
|---|---|---|
| Coal syngas | $H_2$, CO, $CO_2$, $H_2O$, $N_2$ | 100-300 ppm |
| Biogas | $H_2$, CO, $CO_2$, $CH_4$, $H_2O$, $N_2$ | 50-200 ppm |
| Natural gas | $H_2$, $CO_2$, $N_2$, $C_2H_6$, $CH_4$ | >1% |

Mechanistic investigation of sulfur poisoning of the SOFC anode has received increasing research interest recently since better understanding of this issue is crucial for identifying specific mitigation solutions against degradation, including development of sulfur-tolerant anodes. Typically, the performance loss of SOFC anodes in sulfur-containing fuels can be attributed to: (1) physical adsorption/chemisorption of $H_2S$ at surface active sites, leading to reduction of surface area for electrochemical reactions, and (2) sulfidation of anode material due to reaction between sulfur and anode materials resulting in loss of catalytic activity, conductivity and stability. Until now, sulfur-tolerant anodes have been categorized into three types of materials: (1) thiospinels and metal sulfides such as $NiFe_2S_4$, $WS_2$ and $CuCo_2S_4$, (2) cermets such as Ni-scandia-doped zirconia oxide (SSZ) and Cu-ceria anode, and (3) mixed ionic and electronic conductors (MIECs) such as Ti-based perovskite anodes and lanthanum vanadate ($La_{1-x}Sr_xVO_3$). Recently, surface Sb/Ni alloys were found to efficiently minimize the negative effects of sulfur on the performance of Ni/zirconia anode-supported solid oxide fuel cells (SOFCs).

Perovskites with both ionic and electronic conductivity at high temperature and in a reducing environment have received increasing interest in recent years on their application as SOFC anodes or anode components due to reduced interfacial polarization resistance by expanding reaction sites to the whole anode, relatively good compatibility with high-quality electrolytes, mechanical stability during long term service without expansion of metal components, relatively good catalytic activity for hydrogen and hydrocarbon fuel, and higher sulfur tolerance compared to NiO—YSZ components. Therefore, many efforts have been devoted to develop various mixed-ionic-electronic conductor (MIEC) anode materials for the application on a fuel-flexible SOFC with sulfur tolerance.

Although some perovskite materials have shown good catalytic activity for hydrocarbon fuel and have been examined for application as sulfur-tolerant anodes, few reported perovskite anodes can simultaneously display both good sulfur tolerance and catalytic activity for hydrogen and hydrocarbon oxidation.

SUMMARY

Aspects and advantages of the invention will be set forth in part in the following description, or may be obvious from the description, or may be learned through practice of the invention.

In one aspect, the present subject matter is directed to a composite anode for a hydrocarbon solid oxide fuel cell, the anode comprising a layered perovskite ceramic and a bimetallic alloy. In other aspects, fuel cells and methods for manufacturing the same are disclosed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
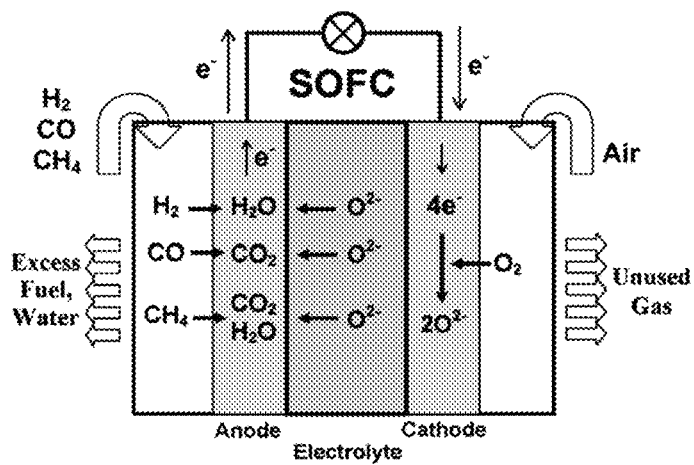
FIG. 1 depicts a schematic view of SOFC operation in accordance with certain aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to a cubic perovskite material, such as $Pr_{0.4}Sr_{0.6}Co_{0.2}Fe_{0.7}Nb_{0.1}O_{3-\delta}$, which can be re-crystallized in-situ into uniformly distributed micron-sized layered perovskite ceramic and nanoscale Co—Fe alloy upon reduction in reducing environment at elevated temperature. This novel material shows high electrode performance. Most importantly, it can simultaneously display both good sulfur tolerance and catalytic activity for hydrogen and hydrocarbon oxidation.

In accordance with the present disclosure, the cubic perovskite material, such as $Pr_{0.4}Sr_{0.6}Co_{0.2}Fe_{0.7}Nb_{0.1}O_{3-\delta}$ (PSCFN), will be re-crystallized into uniformly distributed micron-sized layered perovskite ceramic and nanoscale-Co—Fe alloy upon reduction in hydrogen, which cannot be realized by mechanically mixing the layered perovskite and Co—Fe alloy powders together and co-sintering at elevated temperature. The re-crystallized material exhibits excellent electrical conductivity and anode performance. The layered perovskite structure also shows promising stability in reducing environment. The alloy with the re-crystallized composition contributes catalytic activity for hydrogen and hydrocarbon fuel reforming. The alloy can efficiently minimize the negative effects of sulfur on the cell performance. In addition, the Nb ion has an observed enhancement in electrochemical oxidation of $H_2S$. The novel material is oxidation-reduction reversible; after calcination under oxidizing environment at elevated temperature, the re-crystallized layered perovskite and alloy can be oxidized back to the cubic perovskite, such as $Pr_{0.4}Sr_{0.6}Co_{0.2}Fe_{0.7}Nb_{0.1}O_{3-\delta}$.

$Pr_{0.4}Sr_{0.6}Co_{0.2}Fe_{0.7}Nb_{0.1}O_{3-\delta}$ also shows good cathode performance. Therefore, any possibility of sulfur poisoning or carbon deposition deactivation on the surface of anode can be potentially eliminated by operating the cell reversely with the anode as cathode. In other words, the deactivated electrode can be regenerated.

Further, a novel composite anode is described that can be formed from $K_2NiF_4$-type structured $Pr_{0.8}Sr_{1.2}(Co,Fe)_{0.8}Nb_{0.2}O_{4+\delta}$ (K—PSCFN) matrix with homogeneously dispersed nano-sized Co—Fe alloy (CFA). This composite anode is obtained by annealing perovskite $Pr_{0.4}Sr_{0.6}Co_{0.2}Fe_{0.7}Nb_{0.1}O_{3-\delta}$ (P—PSCFN) in $H_2$ at 900° C. K—PSCFN—CFA composite anode has demonstrated similar catalytic activity to Ni-based cermets anode, excellent sulfur tolerance and coking resistance. Moreover, K—PSCFN—CFA can be oxidized back to P—PSCFN in air at 900° C., demonstrating excellent redox cyclability.

The present disclosure can be better understood with reference to the following examples.

EXAMPLES

Powder Preparation

Cubic perovskite $Pr_{0.4}Sr_{0.6}Co_{0.2}Fe_{0.7}Nb_{0.1}O_{3-\delta}$ (PSCFN) powders can be synthesized by a solid-state reaction method. The precursor powders with stoichiometric amount of $Pr(NO_3)_3 \cdot 6H_2O$, $SrCO_3$, $Co(NO_3)_2 \cdot 6H_2O$, $Fe_2O_3$ and $Nb_2O_5$ are mixed by ball milling. The ball milled precursor powders is calcinated at 1100° C. for 5 h in air to obtain cubic perovskite PSCFN. Then the cubic perovskite PSCFN powder is reduced at 900° C. for 10 h in hydrogen to obtain a novel material with uniformly distributed micron-sized layered perovskite ceramic and nanoscale-Co—Fe alloy.

Figure 2:
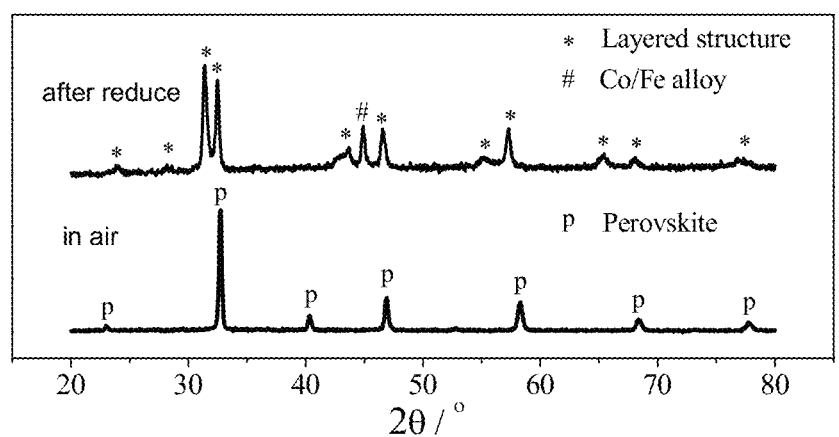
FIG. 2 depicts the XRD of $Pr_{0.4}Sr_{0.6}Co_{0.2}Fe_{0.7}Nb_{0.1}O_{3-\delta}$ (PSCFN) before and after reduction in hydrogen in accordance with certain aspects of the present disclosure.

For analysis of phase formation of perovskite PSCFN after sintering and reduction in reducing environment, XRD has been performed using an X'Pert PRO X-ray diffractometer in the 2θ range of 10-80°. Cu—$K_\alpha$ radiation is used as the X-ray source. The XRD patterns of PSCFN before and after reduction in $H_2$ are shown in FIG. 2. From FIG. 2, it can be clearly seen that the cubic perovskite material PSCFN can be re-crystallized into layered perovskite ceramic and Co—Fe alloy after reduction in hydrogen at 900° C. for 10 h.

Cell Preparation:

$La_{0.8}Sr_{0.2}Ga_{0.83}Mg_{0.17}O_{3-\delta}$ (LSGM) electrolyte is prepared by a solid state reaction method. The starting materials are $La_2O_3$, $SrCO_3$, $Ga_2O_3$ and MgO. The ball-milled mixture of the starting materials is calcined in air at 1250° C. for 10 h. LSGM electrolyte substrates are formed by dry-pressing LSGM powder uniaxially under 200 MPa, followed by sintering at 1450° C. in air for 10 h.

The electrode ink which includes cubic perovskite PSCFN and V-006 (weight ratio of 1:1) is applied to the both surface of the sintered LSGM pellet by screen-printing, followed by firing at 1000° C. in air for 2 h. The thickness of the electrode is ~30 μm and the effective area is 0.33 $cm^2$. To avoid potential catalytic influence on fuel oxidation, Au slurry is printed on the surface of the anode as anodic current collectors. Pt slurry is printed on the surface of the cathode as cathodic current collectors.

The button cells are sealed to one end of an alumina tube with a ceramic paste (Aremco-552). Ambient air is used as the oxidant in the cathode. The electrochemical impedance spectra (EIS) are typically measured in the frequency range from 0.01 Hz to 1 MHz with IM6 & Zennium Electrochemical Workstations.

Figure 3:
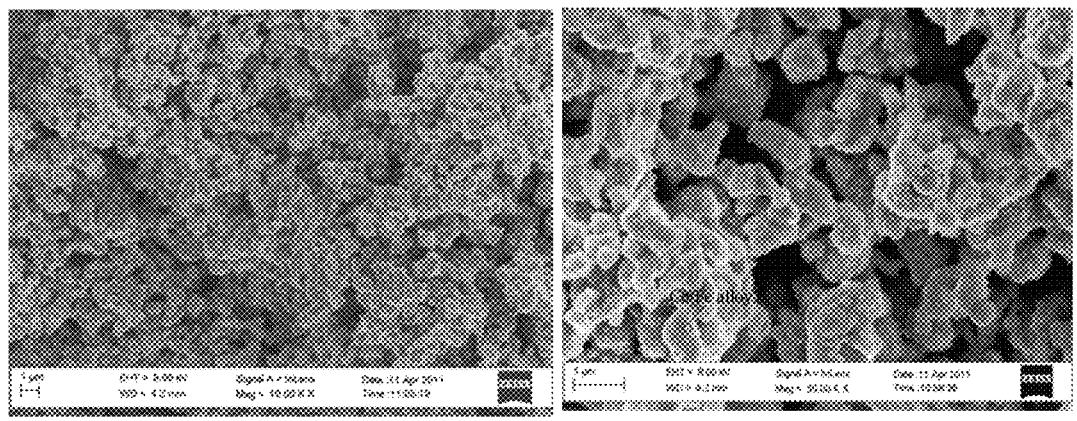
FIG. 3 depicts scanning electron microscopy (SEM) images of an electrode microstructure before (left) and after reduction (right) in hydrogen in accordance with certain aspects of the present disclosure.

Microstructure:

The scanning electron microscopy (SEM) images of the anode microstructure before and after reduction in $H_2$ are shown in FIG. 3. It can be observed that a porous microstructure with 0.5-1 μm single phase cubic perovskite PSCFN particles is obtained before reduction. However, the cubic perovskite $Pr_{0.4}Sr_{0.6}Co_{0.2}Fe_{0.7}Nb_{0.1}O_{3-\delta}$ will be re-crystallized into uniformly distributed micron-sized layered perovskite ceramic and nanoscale-Co—Fe alloy with ~50 nm in size after reduction in hydrogen at 900° C. This micron- and nanoscale-composite microstructure cannot be realized by mechanically mixing the layered perovskite and Co—Fe alloy powders together and then co-sintering at elevated temperature.

Figure 4:
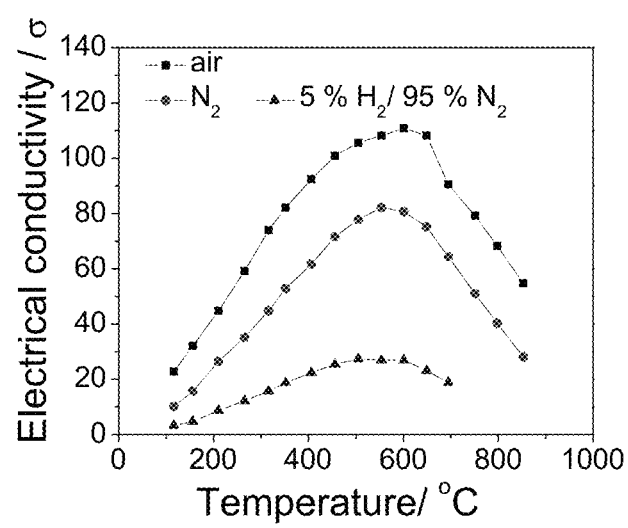
FIG. 4 depicts the electrical conductivity of PSCFN under different atmospheres in accordance with certain aspects of the present disclosure.

Performance:

Shown in FIG. 4 is the electrical conductivity of PSCFN measured under different atmospheres using a four-probe DC measurement. It can be seen that the electrical conductivity increases with the increase in oxygen partial pressure, indicating that PSCFN is p-type semiconductor with electronic holes as charge carriers. The highest conductivity of 110.9 $S \cdot cm^{-1}$ and 26.8 $S \cdot cm^{-1}$ has been achieved at 600° C. in air and 5% hydrogen, respectively. It is adequate for PSCFN to function as a cathode or an anode material.

Figure 5A:
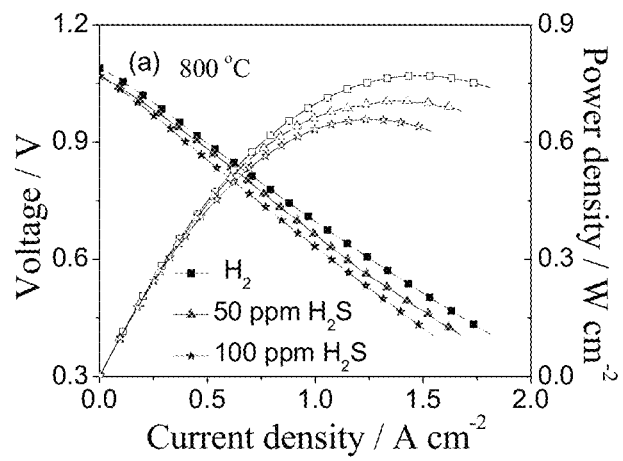
FIG. 5 depicts performance of PSCFN/LSGM/PSCFN symmetrical fuel cell with $H_2$, $H_2$ containing 50 and 100 parts per million (ppm) $H_2S$ ($H_2/H_2S$) as fuel.

FIG. 5a show the performance of LSGM electrolyte supported symmetrical fuel cell with PSCFN/LSGM/PSCFN configuration with $H_2$, $H_2$ containing 50 and 100 parts per million (ppm) $H_2S$ ($H_2/H_2S$) as fuel, and ambient as oxidant. The thickness of the LSGM electrolyte is ~300 μm. An open circuit voltage (OCV) of 1.085 V, close to the theoretical value calculated from Nernst equation, has been obtained in wet $H_2$ (97% $H_2$-3% $H_2O$) at 800° C., with a maxium power density ($P_{max}$) of 770 $mW/cm^2$ at 800° C. For the $H_2S$ containing $H_2$ fuel (50 ppm $H_2S$ and 100 ppm $H_2S$), the $P_{max}$ values are still about 710 and 660 $mW/cm^2$ at 800° C., respectively.

Figure 5B:
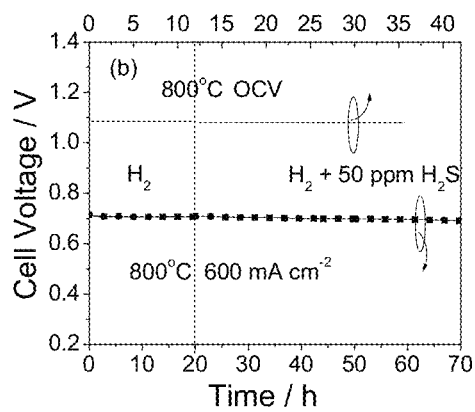

FIG. 5b displays the cell stability operating in 50 ppm $H_2S$ atmosphere with a 0.6 $A/cm^2$ discharged current for over 70 h. It can be seen that the cell was very stable without any observed degradation, suggesting that the PSCFN anode has a good tolerance to $H_2S$. Three reasons are ascribed to contribute to the excellent sulfur tolerance: The novel material is an excellent anode and shows excellent electronic/ionic conductivity; the alloy is also found to efficiently minimize the negative effects of sulfur on the cell performance, similar to Sb/Ni alloys; the Nb ion has an observed enhancement in electrochemical oxidation of $H_2S$, similar to that of $La_{0.7}Sr_{0.3}VO_3$ anode reported and $Nb_2O_5$ containing anode.

Figure 6:
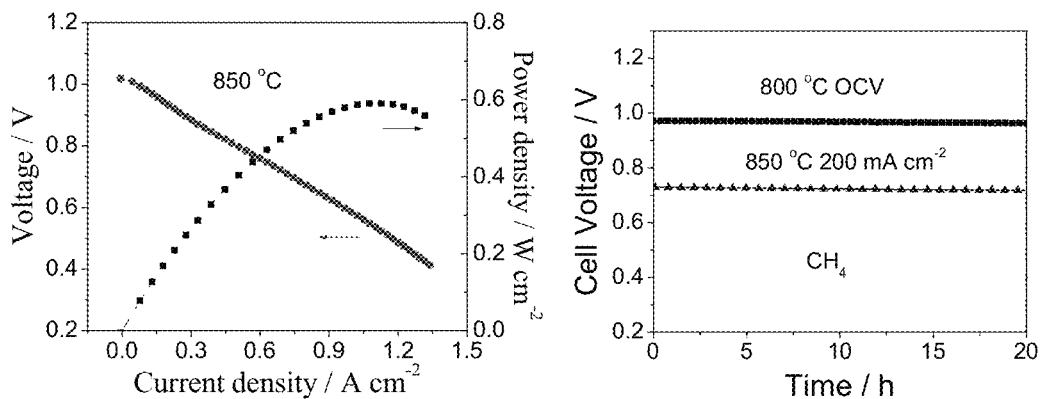
FIG. 6 depicts the performance and stability of the cell PSCFN/LSGM/PSCFN with $CH_4$ as fuel.

Furthermore, a relatively high power density value of 600 $mW/cm^2$ has been obtained in wet $CH_4$ when PSCFN is used as anode with the PSCFN/LSGM/PSCFN fuel cell configuration at 850° C., and no carbon deposition is observed after the cell has been operated under constant current long-term testing, as shown in FIG. 6. Two reasons are ascribed to contribute to the excellent anode catalytic activity for $CH_4$: first, the alloy is a good hydrocarbon catalyst for hydrocarbon reforming and provides electronic conductor similar to that of Sn/Ni alloy; second, the layer perovskite PSCFN provides oxide ion conductivity, which will reduce carbon deposition. Therefore, $CH_4$ can be eventually converted into $CO_2$ and $H_2O$ through the following electrochemical process, $CH_4 + O^{2-} = CO_2 + H_2O + 8$ $e^-$. Further improved cell performance can be achieved by employing an electrode supported cell configuration with thinner LSGM electrolyte.

Furthermore, the cubic perovskite $Pr_{0.4}Sr_{0.6}Co_{0.2}Fe_{0.7}Nb_{0.1}O_{3-\delta}$ is oxidation-reduction reversible; after calcination at oxiding environment, the novel material can be oxidized back to cubic perovskite PSCFN. It has been shown that cubic perovskite PSCFN is also a good cathode material. Therefore, any possibility of sulfur poisoning or carbon deposition deactivation on the surface of anode can be potentially eliminated by operating the cell reversely with the anode as cathode. In other word, the deactivated electrode can be regenerated.

In summary, a novel material has been prepared to act as SOFC anode material. This material has high electrode performance. Most importantly, it can simultaneously display both good sulfur tolerance and catalytic activity for hydrogen and hydrocarbon oxidation.

Composite Anode

P—PSCFN and K—PSCFN powders were synthesized using a solid state reaction method. The precursor powders with stoichiometric amount of $Pr(NO_3)_3 \cdot 6H_2O$, $SrCO_3$, $Co(NO_3)_2 \cdot 6H_2O$, $Fe_2O_3$ and $Nb_2O_5$ were mixed by ball milling. Calcination of the precursor powders was performed at 1050° C. for 5 h in air to obtain pure phase. The $La_{0.8}Sr_{0.2}Ga_{0.83}Mg_{0.17}O_{3-\delta}$ (LSGM) and $Ba_{0.9}Co_{0.7}Fe_{0.2}Nb_{0.1}O_{3-\delta}$ (BCFN) powders were fabricated by a solid-state reaction method, and the GDC powders were prepared by a sol-gel process. Single cells of K—PSCFN—CFA|LSGM|BCFN, K—PSCFN—CFA|LSGM|PSCFN, and K—PSCFN|LSGM|BCFN were LSGM electrolyte supported cells. LSGM electrolyte substrates were formed by dry pressing LSGM powders uniaxially under 200 MPa, and followed by sintering at 1450° C. in air for 10 h. The thickness of the LSGM electrolyte was about 300 μm. The electrode ink consisting of P—PSCFN or BCFN powders and Heraeus binder V-006 (weight ratio of 1:1) was applied to the surface of the sintered LSGM pellet by screen-printing method, and then fired at 1000° C. in air for 2 h. The porous electrode had a thickness of about 30 μm and an effective area of 0.33 cm2. To avoid potential catalytic influence on fuel oxidation, Au slurry was printed on the surface of the anode as current collector. Pt slurry was printed on the surface of the cathode as current collector. For the chemical compatibility study of the K—PSCFN—CFA anode with YSZ electrolyte (~300 μm thickness), the processing and testing temperatures are not higher than 900° C. Since most Co-containing electrode materials have been reported to be chemically incompatible with the YSZ electrolyte at high temperatures, a thin ceria-based buffer layer should be employed to prevent the potential reaction between the K—PSCFN—CFA electrode and YSZ electrolyte if a higher processing temperature is needed.

Electrical conductivity of sintered K—PSCFN—CFA or P—PSCFN bar samples was measured using DC four-probe measurement. Four platinum wires were attached to the bar with platinum paste. The electrical conductivity of K—PSCFN—CFA was studied in 5 vol. % H2-95 vol. % N2, while that of P—PSCFN was measured in Air and $N_2$ at different temperatures.

Button cells were sealed to one end of an alumina tube with a ceramic paste (Aremco-552). The cells were heated up to 800° C. in air. At 800° C., prior to the flow of H2 to the anode, $N_2$ was used to purge the anode side. The cell was heated to 900° C. and held for 1 h to ensure that the P—PSCFN anode was fully annealed. After that, the fuel cells were cooled to 750-850° C. and the electrochemical testing was performed. The electrochemical impedance spectra were typically measured in the frequency range from 0.01 Hz to 1 MHz with IM6 Electrochemical Workstations. All fuel cells were first conditioned at a constant current density in pure $H_2$ to obtain steady state performance before switching to $H_2$ containing $H_2S$ or hydrocarbon fuel. Since $H_2S$ can dissolve in water, $H_2$ containing 50 or 100 ppm $H_2S$ were introduced directly to the cell, and a separate flow of $H_2$ was passed through a water bubbler at room temperature to bring water vapor into the anode. The fuel flow rate was 40 mL min−1, and ambient air was used as the oxidant.

The X-ray diffraction (XRD) pattern was recorded on an Rigaku D/Max 2100 Powder X-ray Diffractometer with a Cu—Kα radiation (λ=1.5418 Å), employing a scan rate of 5 deg min−1 in the 2θ range from 20° to 80°. The microstructure of the powders and the electrodes were characterized using a scanning electron microscopy (SEM, FEI Quanta 200), a scanning transmission electron microscopy (STEM, Hitachi, HD2000 ultrathin film evaluation system) equipped with an energy dispersive spectroscopy (EDS) analyzer, and a high-resolution transmission electron microscopy (HRTEM).

Performance

Figure 7:
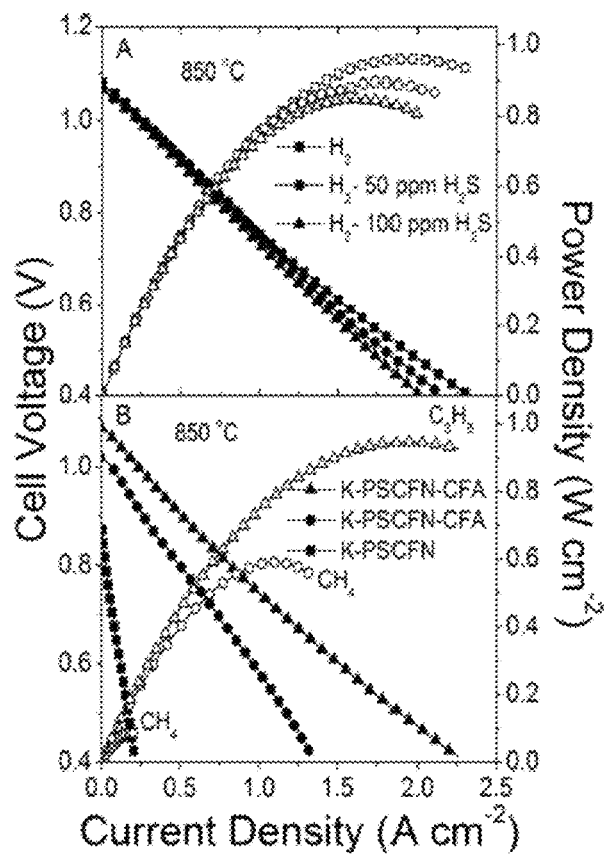
FIG. 7 depicts cell voltage and power density as a function of current density for the LSGM electrolyte-supported single cells with P—PSCFN as cathode and (A) K—PSCFN—CFA as anode in $H_2$ and $H_2/H_2S$ at 850° C.; and (B) with K—PSCFN—CFA or K—PSCFN as anode in $CH_4$ and $C_3H_8$ at 850° C., respectively.
Figure 8:
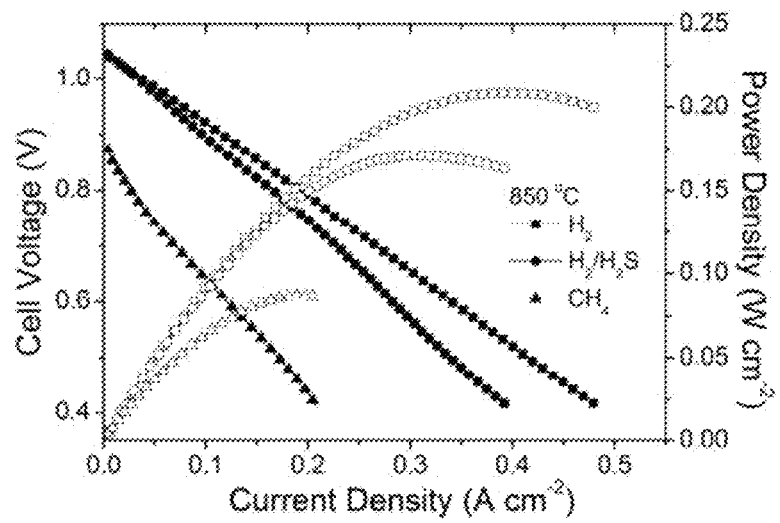
FIG. 8 depicts current density-voltage and power density curves for K—PSCFN|LSGM|P—PSCFN cells with K—PSCFN as the anode operated at 850° C., with $H_2$, $H_2$ containing 50 ppm $H_2S$ and CH4 as the fuel and ambient air as the oxidant, respectively.
Figure 9:
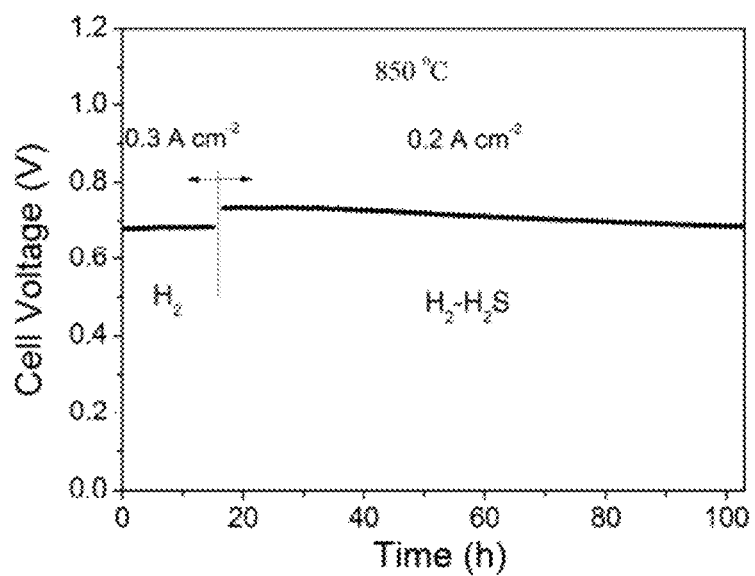
FIG. 9 depicts cell voltage of K—PSCFN|LSGM|P—PSCFN cells with K—PSCFN as the anode operated under a constant current load of 0.3 A $cm^{-2}$ in $H_2$, and 0.2 A $cm^{-2}$ with $H_2$ containing 50 ppm $H_2S$ as the fuel and air as the oxidant at 850° C., respectively.
Figure 10:
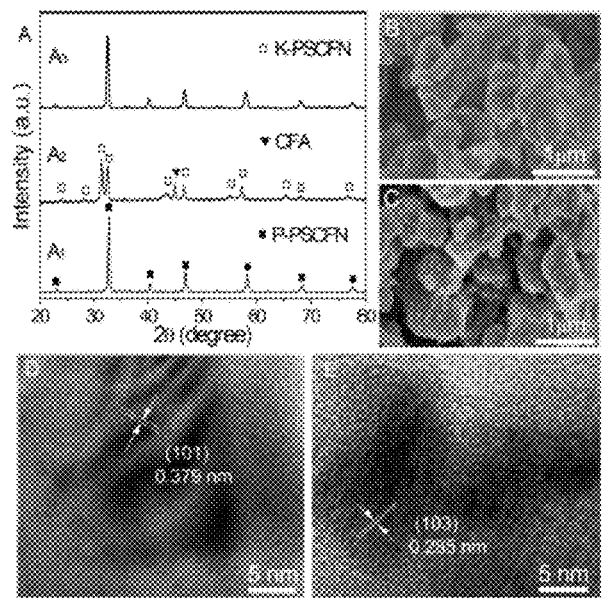
FIG. 10 depicts (A) X-ray diffraction (XRD) patterns of (A1) P—PSCFN sintered at 1050° C. in air; (A2) P—PSCFN annealed in 5 vol % $H_2$-95 vol % $N_2$ at 900° C.; and (A3) K—PSCFN—CFA composite re-oxidized in air at 900° C.; (B and C) SEM images and (D and E) HRTEM images of P—PSCFN before and after being reduced in $H_2$ at 900° C.
Figure 11:
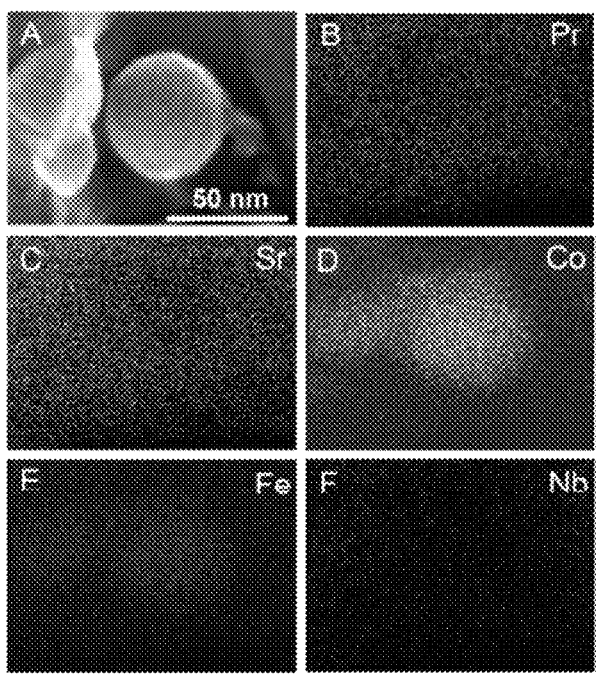
FIG. 11 depicts Pr, Sr, Co, Fe and Nb mapping analysis of the $K_2NiF_4$-type structured $Pr_{0.8}Sr_{1.2}(Co,Fe)_{0.8}Nb_{0.2}O_{4+\delta}$ (K—PSCFN) matrix with homogenously dispersed nano-sized Co—Fe alloy (CFA) composite anode surface after P—PSCFN being reduced by $H_2$ at 900° C. for 10 h.

FIG. 7 shows the typical performance of K—PSCFNCFA|LSGM|P—PSCFN electrolyte-supported single cells using $H_2$, $H_2$ containing 50 or 100 ppm $H_2S$ ($H_2$-50 ppm $H_2S$ or $H_2$-100 ppm $H_2S$) as the fuel and ambient air as the oxidant. The cell maximum power density (Pmax) in $H_2$ reached 0.96 W cm$^{-2}$ at 850° C. When the anode feeding gas was switched to $H_2$ containing 50 and 100 ppm $H_2S$, the Pmax values were still 0.92 and 0.89 W cm$^{-2}$ at 850° C., respectively. However, when pure K—PSCFN was used as anode in a similar K—PSCFN|LSGM|PPSCFN cell configuration, the Pmax was only 0.21 W cm$^{-2}$ in $H_2$ and 0.17 W cm$^{-2}$ in $H_2$ containing 50 ppm $H_2S$ at 850° C. (FIG. 8), indicating that the CFA phase in the K—PSCFNCFA composite has significant impact on the catalytic activity of the anode. The performance stability of the K—PSCFN|LSGM|PPSCFN cells was tested under a constant current load of 0.3 A cm$^{-2}$ in $H_2$ for 20 h and then under a constant current load of 0.2 A cm$^{-2}$ in $H_2$-50 ppm $H_2S$ at 850° C. (FIG. 9). The cell exhibited relatively stable power output during 100 h operation, indicating that K—PSCFN anode has reasonable sulfur tolerance, but low catalytic activity toward $H_2$ oxidation. When the anode feeding gas was switched to $CH_4$, the cell performance dropped dramatically with Pmax value of 0.086 W cm$^{-2}$ at 850° C. (FIG. 7B), indicating that pure K—PSCFN anode has relatively low catalytic activity towards methane oxidation. However, relatively high Pmax of 0.6 W cm$^{-2}$ in $CH_4$ and 0.94 W cm$^{-2}$ in $C_3H_8$ were obtained at 850° C. for K—PSCFN—CFA|LSGM|P—PSCFN single cells using K—PSCFN—CFA composite anode (FIG. 7B). Therefore, the enhanced performance of K—PSCFN—CFA anode in hydrogen/hydrocarbon can be mainly ascribed to the well dispersed nano-sized CFA phase in the K—PSCFN matrix, as indicated in the SEM images in FIG. 10. The P—PSCFN was transformed to a composite of K—PSCFN matrix with uniformly dispersed nano-sized CFA particles (~50 nm) after calcining P—PSCFN in $H_2$ at 900° C. (FIG. 10C and FIG. 11). Further, it has been demonstrated that the K—PSCFN—CFA composite can be re-oxidized back to P—PSCFN at 900° C. in air (FIG. 10A). High-resolution transmission electron microscopy (HRTEM) analysis of P—PSCFN has revealed a lattice spacing of 0.379 nm (FIG. 10D), consistent with the 0.374 nm separation between two (101) planes of the P—PSCFN crystalline structure (space group Pnma) determined by the XRD analysis. However, a lattice spacing of 0.285 nm has been obtained after P—PSCFN has been reduced in $H_2$ at 900° C. (FIG. 10E), similar to the lattice spacing of 0.284 nm between two (103) planes in the K—PSCFN crystalline structure (space group I41) determined by the XRD analysis.

Figure 12:
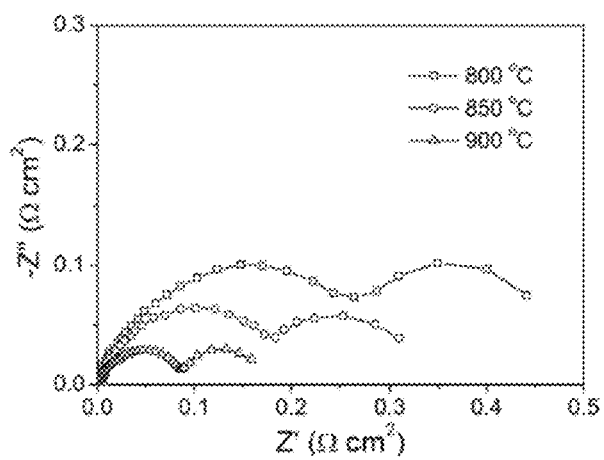
FIG. 12 depicts impedance spectra of the symmetric half cell with K—PSCFN—CFA composite electrode measured in $H_2$ at 800° C., 850° C., and 900° C., respectively; the ohmic contribution from the LSGM electrolyte has been subtracted from the overall impedance spectra.
Figure 13:
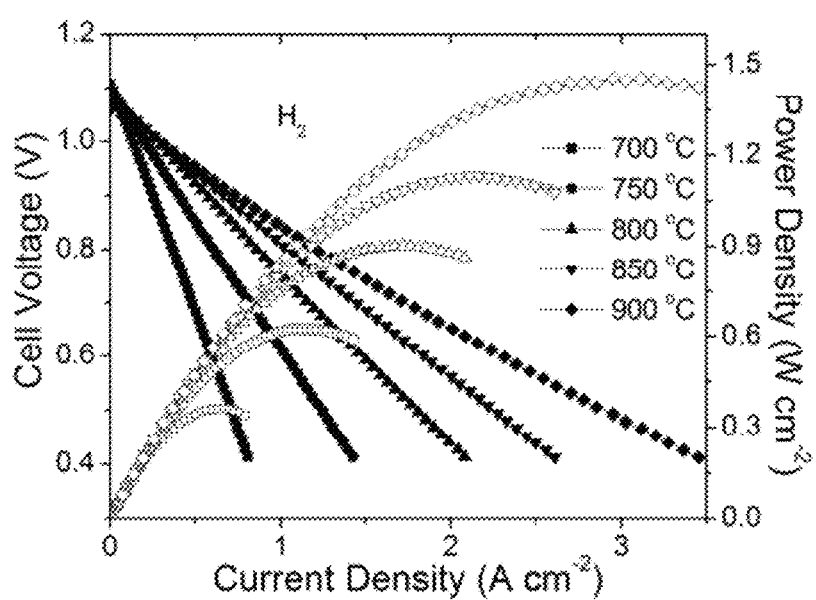
FIG. 13 depicts current density-voltage and power density curves for K—PSCFNCFA|LSGM|BCFN cell operating from 700° to 900° C. with $H_2$ as fuel and ambient air as oxidant. BCFN represents $Ba_{0.9}Co_{0.7}Fe_{0.2}Nb_{0.1}O_{3-\delta}$.

The anode polarization resistance was evaluated using a symmetric half cell configuration with K—PSCFN—CFA as both working and counter electrodes on a LSGM electrolyte in $H_2$, and the results at different temperatures are shown in FIG. 12. The anode polarization resistances are 0.44 Ωcm2 at 800° C., 0.31 Ωcm2 at 850° C. and 0.16 Ωcm2 at 900° C., which are much smaller than that of the LSCM ceramic anode and comparable to that of the traditional Ni—YSZ or Ni-GDC anode. The electrochemical performance of the K—PSCFNCFA anode has also been studied in LSGM electrolyte-supported single cells with $Ba_{0.9}Co_{0.7}Fe_{0.2}Nb_{0.1}O_{3-\delta}$ (BCFN) as the cathode. BCFN has recently been reported to be a promising SOFC cathode material, possessing good chemical stability but similar catalytic activity for oxygen reduction to $Ba_{0.5}Sr_{0.5}Co_{0.8}Fe_{0.2}O_{3-\delta}$ (BSCF). Pmax of the cell were 0.36, 0.62, 0.9, 1.13, and 1.45 W cm$^{-2}$ at 700, 750, 800, 850 and 900° C., respectively (FIG. 13), comparable to those of the cells with Ni-based anode at similar testing conditions, e.g., at 800° C., 0.618 W cm$^{-2}$ of Ni-GDC|GDC|BCFN single cells, 0.98 W cm$^{-2}$ of Ni-DC|LSGM|BCFN single cells, and 0.92 W cm$^{-2}$ of Ni—SDC|LSGM|LSCF (SDC, $Sm_{0.2}Ce_{0.8}O_{1.9}$; LSCF, $La_{0.6}Sr_{0.4}Co_{0.8}Fe_{0.2}O_{3-\delta}$) single cells (Table II). On the other hand, they are superior to those of cells using other Ni-free sulfur tolerant ceramic anodes, e.g., $La_{0.7}Sr_{0.3}VO_3$ (LSV), $La_{0.2}Sr_{0.8}TiO_3$ (LST), $Sr_{0.88}Y_{0.08}TiO_{3-\delta}$ (SYT), $La_{0.75}Sr_{0.25}Cr_{0.5}Mn_{0.5}O_{3-\delta}$ (LSCM), $Sr_2MgMoO_{6-\delta}$ (SMM) and $Sr_2Fe_{1.5}Mn_{0.5}O_{6-\delta}$ (SFM) (Table II).

Figure 18:
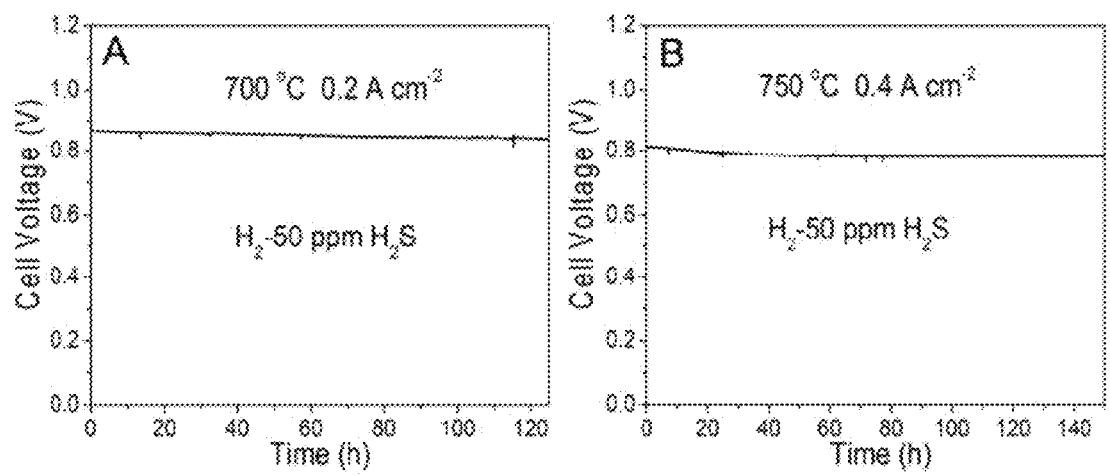
FIG. 18 depicts cell voltage as a function of time for the K—PSCFN—CFA|LSGM|P—PSCFN cells operated under a constant current load of (A) 0.2 and (B) 0.4 A cm−2 in $H_2$-50 ppm $H_2S$ at 700° C. and 750° C., respectively.
Figure 19:
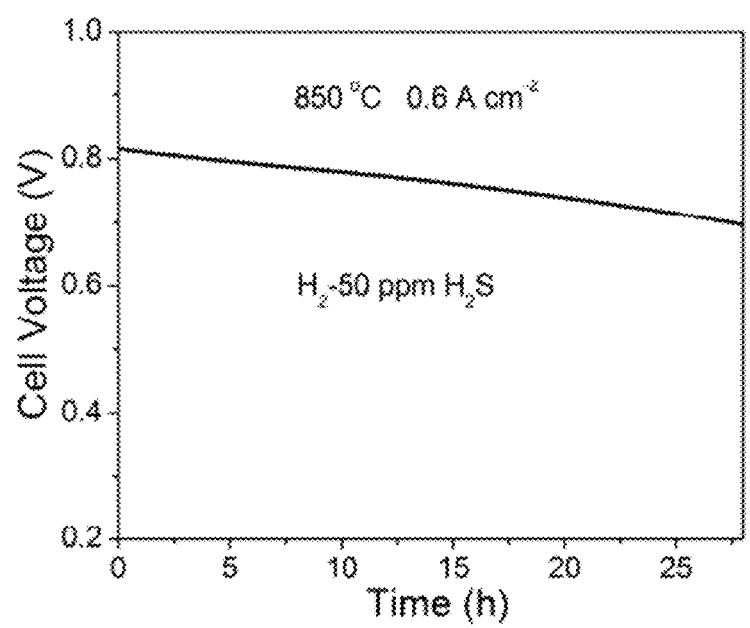
FIG. 19 depicts cell voltage of single cells with the cell configuration of Ni-GDC|LSGM|BCFN operated under constant current load of 0.6 A $cm^{-2}$ in H, containing 50 ppm $H_2S$ at 850° C.

~500 h operation. When the cell testing temperature was lowered to 700 and 750° C., the cell power output was still very stable under a constant current load of 0.2 A cm$^{-2}$ at 700° C. and 0.4 A cm$^{-2}$ at 750° C. in H$_2$-50 ppm H$_2$S (FIG. 18), indicating that the K—PSCFN—CFA anode possesses excellent tolerance to sulfur poisoning. In contrast, the performance of LSGM electrolyte-supported cells with Ni-GDC anode and BCFN cathode degraded rapidly in H2-50 ppm H2S at 800° C. (FIG. 19).

Figure 17:
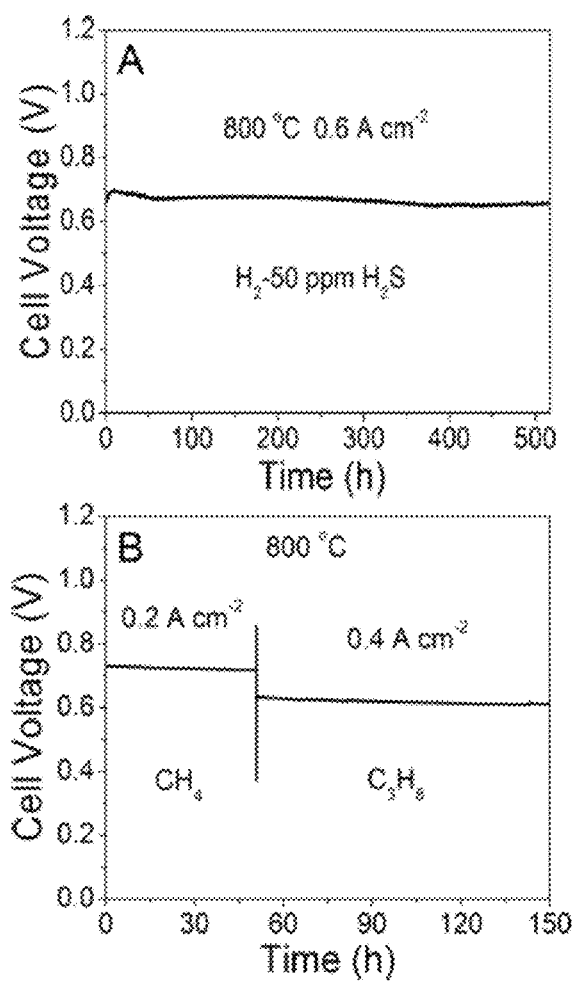
FIG. 17 depicts cell voltage as a function of time at 800° C. for the K—PSCFN—CFA|LSGM|P—PSCFN single cells operated under a constant current load of (A) 0.6 A $cm^{-2}$ in $H_2$-50 ppm $H_2S$, and (B) 0.2 A $cm^{-2}$ in $CH_4$ and 0.4 A $cm^{-2}$ in $C_3H_8$.

The coking resistance for direct oxidation of hydrocarbon fuels of the K—PSCFN—CFA|LSGM|P—PSCFN cells is exhibited in FIG. 17B. When CH$_4$ or C$_3$H$_8$ was supplied to the anode, no significant cell voltage change was observed under a constant current load of 0.2 A cm$^{-2}$ using CH$_4$ or 0.4 A cm$^{-2}$ using C$_3$H$_8$ as the fuel at 800° C., respectively. It is well known that carbon can easily build up on conventional Ni-

TABLE II

| Anode material | Cell configuration | Testing temperature (° C.) | Maximum power density ($P_{max}$, W cm$^{-2}$) | Reference |
|---|---|---|---|---|
| K-PSCFN-CFA | K-PSCFN-CFA\|LSGM\|BCFN | 800 | 0.9 | |
| Ni-GDC | Ni-GDC\|GDC\|BCFN | 800 | 0.618 | [25] |
| | Ni-GDC\|LDC\|LSGM\|BCFN | 800 | 0.98 | [26] |
| | Ni-SDC\|LDC\|LSGM\|LSCF | 800 | 0.92 | [27] |
| LSV | LSV\|YSZ\|SSC-GDC | 800 | 0.14 | [28] |
| LST | LST\|LSGM\|BSCF | 800 | 0.06 | [29, 30] |
| SYT | Pd-SYT-LDC\|LDC\|LSGM\|SSC | 800 | 0.577 | [31] |
| LSCM | LSCM\|LSGM\|BSCF | 800 | 0.166 | [32] |
| SMM | SMM\|LDC\|LSGM\|SCF | 800 | 0.838 | [12] |
| SFM | SFM\|LSGM\|SFM | 800 | 0.5 | [7] |

SSC: $Sm_{0.5}Sr_{0.5}CoO_3$. LDC: $La_{0.4}Ce_{0.6}O_{1.8}$. SCF: $SrCo_{0.8}Fe_{0.2}O_{3-\delta}$.

Moreover, it should be noted that all the button cells were fabricated by screen-printing the electrode ink directly onto either surface of the 300-μm thick LSGM electrolyte. Therefore, using a thinner electrolyte would greatly reduce the cell ohmic resistance while optimizing electrode microstructure through adding pore formers to the electrode ink or infiltration of fine electrode particles would dramatically reduce the cell electrode polarization resistance, consequently further increasing the cell performance and lowering the cell operating temperature.

Figure 14:
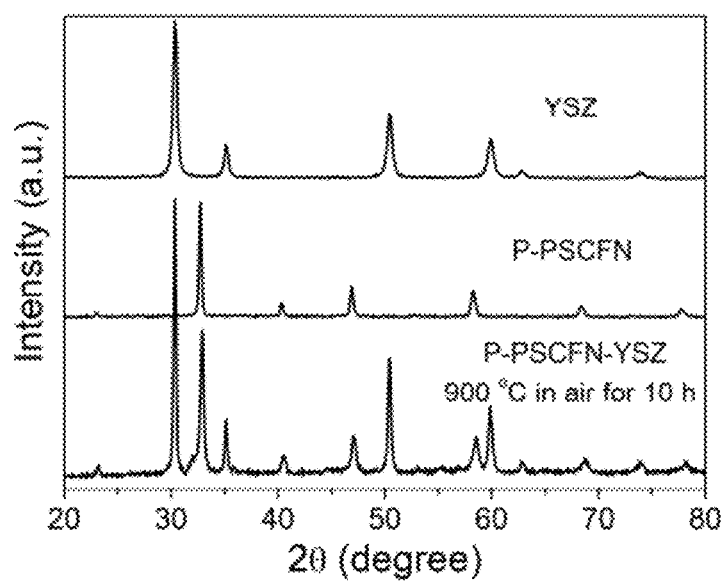
FIG. 14 depicts x-ray diffraction (XRD) patterns of (A) YSZ, (B) P—PSCFN and (C) P—PSCFNYSZ sintered in air at 900° C. for 10 h.
Figure 15:
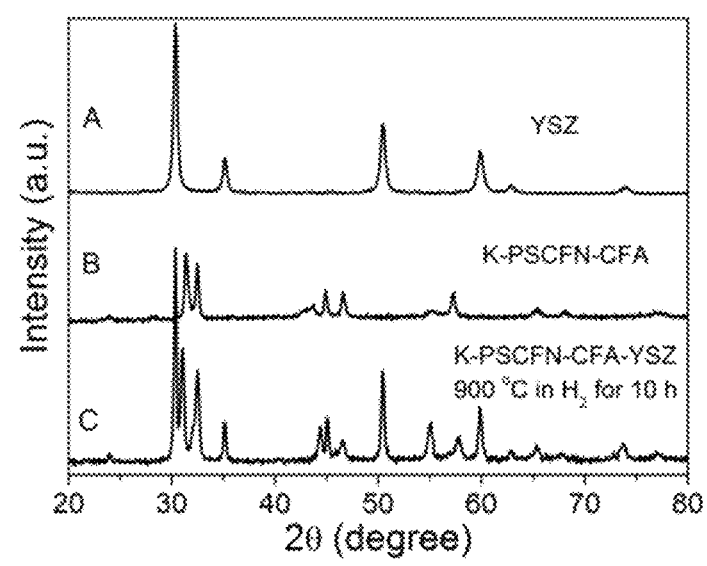
FIG. 15 depicts X-ray diffraction (XRD) patterns of (A) YSZ, (B) K—PSCFN—CFA and (C) KPSCFN—CFA-YSZ sintered in $H_2$ at 900° C. for 10 h.
Figure 16:
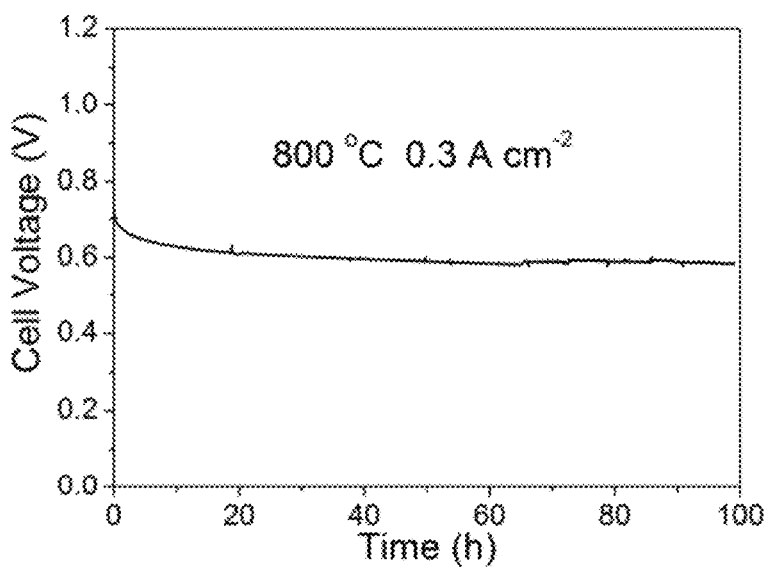
FIG. 16 depicts cell voltage as a function of time of K—PSCFN—CFA|YSZ|BCFN tested at 800° C. under constant current of 0.3 A $cm^{-2}$.

In order to evaluate the chemical compatibility of K—PSCFNCFA anode material with YSZ electrolyte material, the P—PSCFNYSZ mixture has been sintered in air at 900° C. for 10 h while the K—PSCFN—CFA-YSZ mixture has been sintered in H$_2$ at 900° C. for 10 h. In comparison to the XRD patterns of pure YSZ, P—PSCFN and K—PSCFN—CFA powders, XRD pattern of the mixture of P—PSCFN and YSZ as well as that of the mixture of K—PSCFN—CFA and YSZ sintered at 900° C. showed no observable impurity phases (FIGS. 14 and 15). In addition, single cells with the cell configuration of K—PSCFN—CFA|YSZ|BCFN have also been evaluated using hydrogen as fuel and ambient air as oxidant, showing relatively stable cell performance under constant current density of 0.3 A cm–2 at 800° C. (FIG. 16, indicating that the K—PSCFN—CFA is chemically compatible with YSZ electrolyte at the cell fabrication and testing conditions studied.

Figure 20:
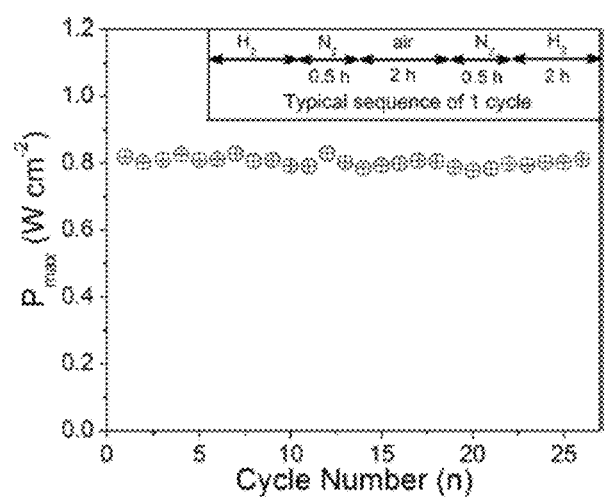
FIG. 20 depicts redox cycling stability of the K—PSCFN—CFA composite anode in single cells with cell configuration of K—PSCFN—CFA|LSGM|P—PSCFN at 850° C.; in each cycle, after the V-I curve was measured, $H_2$ flow to the anode was stopped while the cell was still maintained at 850° C. and $N_2$ was used to purge the anode for 0.5 h; air was subsequently supplied to the anode while the furnace was heated up to 900° C. and held for 2 h; after the air flow was terminated, $N_2$ was used to purge the anode for 0.5 h; finally, $H_2$ was supplied to the anode for 2 h while the cell was cooled down to 850° C.

To determine the sulfur tolerance of the K—PSCFN—CFA anode, the voltage of K—PSCFN—CFA|LSGM|P—PSCFN single cells was recorded as a function of time under a constant current load of 0.6 A cm$^{-2}$ operating in H$_2$ containing 50 ppm H$_2$S at 800° C., as shown in FIG. 17A. The cell showed excellent stability using H$_2$-50 ppm H$_2$S as the fuel at 800° C. and no significant power output degradation was observed for based anode when directly operating on dry CH$_4$. According to the density functional theory (DFT) calculations and experimental studies, bi-metallic alloy can preferentially oxidize carbon atoms and fragments, removing them from the surface of the electrocatalyst rather than forming carbon-carbon bonds as does in monometallic Ni. These results suggest that K—PSCFN—CFA composite is a promising anode material with sulfur tolerance and coking resistance. Finally, the cyclic stability of the K—PSCFN—CFA composite anode was demonstrated in single cells with the configuration of K—PSCFN—CFA|LSGM|P—PSCFN. The cell was initially operated under a constant current load of 0.6 A cm$^{-2}$ in H$_2$ at 850° C. for 24 h to obtain a stable cell performance. The current load was then removed and a voltage-current (V-I) curve was measured to obtain the maximum power density. Subsequently, the K—PSCFN—CFA anode was subjected to the cyclic test by switching the anode gas stream between H$_2$ and air, and the cell maximum power density were recorded after each cyclic test. As presented in FIG. 20, the cell maximum power output was not affected by the redox cycling of the anode during a total of 26 cyclic testing, indicating that the K—SCFN—CFA has excellent redox-reversibility.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A composite anode for a hydrocarbon solid oxide fuel cell, the anode comprising a layered perovskite ceramic and a bi-metallic alloy, wherein the layered perovskite comprises $Pr_{0.8}Sr_{1.2}(Co,Fe)_{0.8}Nb_{0.2}O_4$.

2. The anode of claim 1, wherein the bi-metallic alloy comprises Co—Fe.

3. The anode of claim 1, wherein the anode is configured to be oxidized and comprise a cubic perovskite.

4. The anode of claim 1, wherein the layered perovskite ceramic has a lattice spacing of less than 0.5 nanometers.

5. The anode of claim 1, wherein the layered perovskite ceramic has a lattice spacing of less than 0.3 nanometers.

6. A hydrocarbon solid oxide fuel cell comprising: an anode, the anode comprising layered perovskite ceramic and a bi-metallic alloy, wherein the anode comprises $Pr_{0.8}Sr_{1.2}(Co,Fe)_{0.8}Nb_{0.2}O_4$; a cathode; and an electrolyte.

7. The fuel cell of claim 6, wherein the bi-metallic alloy comprise Co—Fe.

8. The fuel cell of claim 6, wherein the cathode comprises $Ba_{0.9}Co_{0.7}Fe_{0.2}Nb_{0.1}O_3$.

9. The fuel cell of claim 6, wherein the electrolyte comprises $La_{0.8}Sr_{0.2}Ga_{0.83}Mg_{0.17}O_3$.

10. The fuel cell of claim 6, wherein the cathode comprises $Ba_{0.9}Co_{0.7}Fe_{0.2}Nb_{0.1}O_3$ and the electrolyte comprises $La_{0.8}Sr_{0.2}Ga_{0.83}Mg_{0.17}O_3$.

11. A method of forming a composite anode for a hydrocarbon solid oxide fuel cell, the method comprising: printing electrode ink on an electrolyte surface, the electrode ink comprising a layered perovskite ceramic and a bi-metallic alloy, wherein the layered perovskite comprises $Pr_{0.8}Sr_{1.2}(Co,Fe)_{0.8}Nb_{0.2}O_4$.

12. The method of claim 11, wherein the bi-metallic alloy comprise Co—Fe.

13. The method of claim 11, further comprising oxidizing the anode to form a cubic perovskite.

* * * * *